United States Patent
Tang

(10) Patent No.: US 11,334,938 B2
(45) Date of Patent: May 17, 2022

(54) SYSTEM AND METHOD FOR CONTINUOUS VIRTUAL FITTING USING VIRTUAL FITTING CATALOGS

(71) Applicant: Grace Tang, Stockton, CA (US)

(72) Inventor: Grace Tang, Stockton, CA (US)

( * ) Notice: Subject to any disclaimer, the term of this patent is extended or adjusted under 35 U.S.C. 154(b) by 211 days.

(21) Appl. No.: 16/858,550

(22) Filed: Apr. 24, 2020

(65) Prior Publication Data

US 2021/0334887 A1 Oct. 28, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0643* (2013.01); *G06Q 30/0282* (2013.01); *G06Q 30/0603* (2013.01); *G06Q 30/0621* (2013.01)

(58) Field of Classification Search
CPC ........... G06Q 30/0643; G06Q 30/0282; G06Q 30/0603; G06Q 30/0621
See application file for complete search history.

(56) References Cited

U.S. PATENT DOCUMENTS

| | | | |
|---|---|---|---|
| 2010/0172567 A1* | 7/2010 | Prokoski | G06K 9/00 348/47 |
| 2011/0040539 A1* | 2/2011 | Szymczyk | H04N 5/23229 709/204 |
| 2013/0215116 A1* | 8/2013 | Siddique | G06Q 20/40 705/26.7 |

FOREIGN PATENT DOCUMENTS

WO WO-2014159726 A1 * 10/2014 ........... G06T 7/0032

OTHER PUBLICATIONS

Meng, Yuwei, Pik Yin Mok, and Xiaogang Jin. "Interactive virtual try-on clothing design systems." Computer-Aided Design 42.4 (2010): 310-321. (Year: 2010).*

* cited by examiner

*Primary Examiner* — Matthew E Zimmerman

(57) ABSTRACT

A continuous virtual fitting system for enabling a continuous virtual fitting and custom configuration of products and prototypes according to a procedure of processing and storing virtual fitting images with placeholder configurations in virtual fitting catalogs, creating automatic virtual fitting of variations of the products and prototypes using the virtual fitting catalogs.

23 Claims, 15 Drawing Sheets

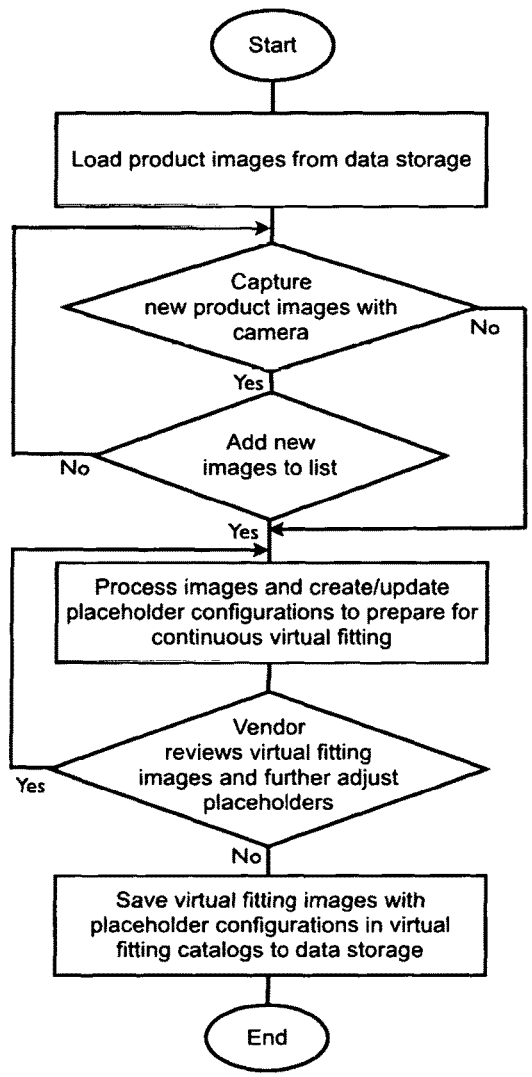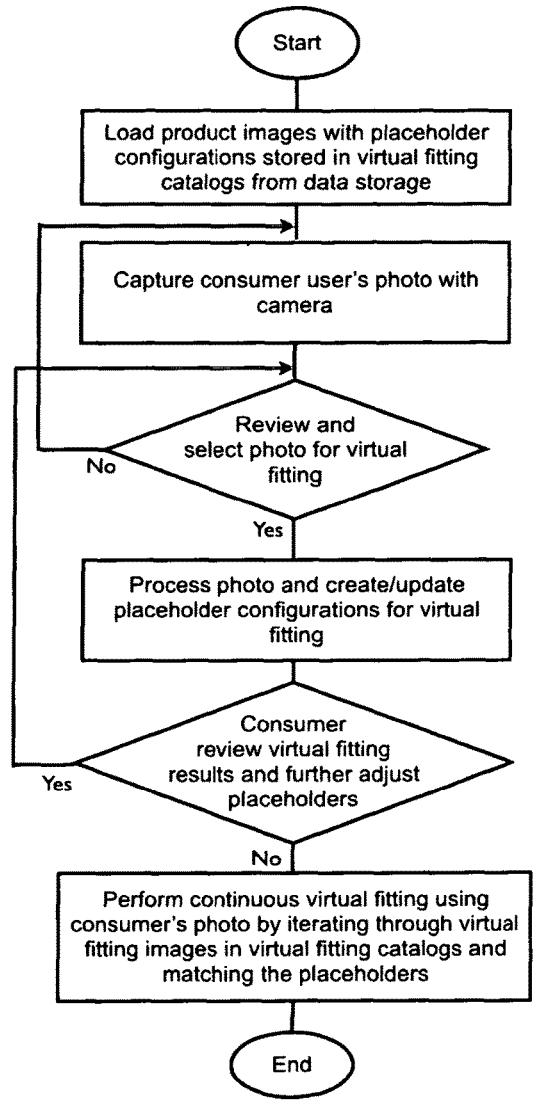
FIG. 3A
FIG. 3B

◆ General User Review  ○ Potential Customers's Review

SYSTEM AND METHOD FOR CONTINUOUS VIRTUAL FITTING USING VIRTUAL FITTING CATALOGS

CROSS-REFERENCE TO RELATED APPLICATIONS

This is a division of application Ser. No. 14/153,000, filed on Jan. 11, 2014, entitled "System and Method for Virtual Fitting and Consumer Interaction", naming Grace Tang aka Xiaofan Tang as the inventor.

BACKGROUND

1. Field of the Invention

This invention relates generally to touch screen mobile/tablet/TV application system. More particularly, the invention herein relate generally to a system and method of customizing computer systems for creating virtual fitting experiences enhancing interaction between consumer and vendor, and more particularly, creating continuous virtual fitting experiences using virtual fitting images with placeholder configurations stored in virtual fitting catalogs.

2. Discussion of the Related Art

When a consumer shops for apparels and accessories, he/she often needs to try on the products to see whether the product fits his/her style and taste. The process is that a consumer goes to a fitting room/area where a mirror is supplied, wears the apparel and/or accessories, looks into the mirror, reviews the reflection from the mirror, and makes the decision whether the product fits or not. When the consumer decides that the product fits, the consumer may proceed to purchase the products.

This is an inefficient process for the following reasons.

The consumer needs to pick out the apparels from the shelf, and physically fits into each one of them to generate the visual fitting result in the mirror.

Consumer may lost the interest of further fitting, after trying on a few items.

Consumer are not able to view most apparels in the store because of the large amount of the inventory.

Consumer may miss the right apparel to purchase due to the large amount of the inventory in the store.

If an apparel is not in stock, consumer can not try it on. The vendor misses a selling opportunity.

Consumer can't fit into apparel doing online shopping, and will return apparel that does not fit after receiving the package in mail.

Returned items create expenses in product shipping, handling, packaging, storage and etc.

Fitting causes wear and tear of the apparels.

Apparels less than brand new condition are harder to sell, may need to sell at reduced price.

Apparels that have sever wear and tear are wasted, increase operation cost for the vendors.

SUMMARY

According to one embodiment, in a multimedia device, a method, apparatus, and system for presenting products to user, provide the means and methods for continuous virtual fitting a plurality of products and prototypes images with user specific image/photo through graphical image processing and generation, using virtual fitting images with placeholder configurations stored in virtual fitting catalogs. Receive user review and input after user observes the visual effect generated by the resulting graphical images. Collect and manage user input data and facilitate interaction between consumers and vendors.

In another embodiment, a continuous virtual fitting system for enabling a continuous virtual fitting and custom configuration of products and prototypes according to a procedure of processing and storing virtual fitting images with placeholder configurations in virtual fitting catalogs, creating automatic virtual fitting of variations of the products and prototypes using the virtual fitting catalogs, said system includes a camera, a user interface for vendors, a memory, a processor, and a consumer user interface.

When a consumer wears an apparel and views his/her reflection from the mirror, what he/she sees is a combination of reflections generated by his/her own body as well the one generated by the apparel, which are fitted on and/or positioned on his/her body. By viewing this combination of images, the consumer can visualize how the apparel fits, whether it is to his/her style and taste, and make the purchase decision.

My invention creates a virtual fitting system that creates, processes and manages an image and data repository of a plurality of products, apparels, accessories and etc. During the virtual fitting process, it captures an image of the consumer, processes the image, creates the visualization graphical result of the consumer wearing the apparels. By processing the images of the apparels and of the consumer, through image cropping, positioning, scaling, rotating, stretching, zooming, compressing and etc, the virtual fitting system generates the visual result of the consumer wearing the apparels. Consumer can then review the graphical result and visualize he/her wearing the apparels, and decide whether the apparel fits his/her style and taste.

Furthermore, through the virtual fitting system, the consumer can fit multiple apparels and accessories at the same time, and position them at different places on the body. Consumer can also input customization request, redesign the apparel, leave reviews and feedbacks, order and/or preorder the apparels, as well as conduct other consumer interaction activities by using the graphical user interface provided by the virtual fitting system.

Furthermore, the virtual fitting system are used to generate visualization result for fitting other types of products to the specified objects and/or environment selected by the consumer, each located at a different position in the generated image.

For example, a consumer plans to purchase a furniture from a retail store. The consumer may take a picture at home of the space and surrounding area where the furniture will be placed. The consumer brings this picture to the furniture store, loads the picture into the virtual fitting system, and mark the placeholder for the area where the furniture will be placed. Consumer also selects different pieces of furniture from the inventory list. The virtual fitting system process the images and generates the visual result of the furniture being placed inside the consumer's house, the consumer reviews this visual effect and make the purchase decision.

Furthermore, the virtual fitting system are used to generate visualization result for fitting an image, a sign, a fixture and/or etc to a specified object selected by the consumer.

For example, when a consumer may want to paint an advertisement sign on a car. The consumer take a photo of the car, use the virtual fitting system, the consumer marks the placeholder for the area where the sign can be posted. The consumer then select the image of the sign, and use the virtual fitting system to generate the visual result of the car having the sign painted on top of it.

As another example, a consumer wants to do some remodeling work for the front of his/her house. The consumer takes a picture of the front of the house, marks the placeholders for the areas where he/she want to change using the virtual fitting system. The consumer then pick out the images for the remodeling components that he/she want to put in, add them into the inventory list of virtual fitting system, and configure them as needed. During the virtual fitting process, consumer select the components from the inventory list, and the virtual fitting system will process the images and position the remodeling components on top of the house image. The consumer can then visualize how the house will look like after the remodeling work is completed, without really going through the lengthy remodeling process.

The system can be used to assist user to virtually try on apparels and/or personal items including but not limited to clothing, accessories, purse, belt, hat, necklace, shoes, watch, jewelry, and etc. An apparel can be positioned graphically as desired with the image of the user, thus generates a virtual fitting visual effect. By processing the images of the apparels and of the user, through image cropping, positioning, scaling, rotating, stretching, zooming, compressing, removing and/or replacing background, changing color and/or transparency and etc, the virtual fitting system generates the visual result of the user wearing the apparels.

The virtual fitting system are also used to generate visual result for fitting other types of products to object/environment selected by the consumer, through graphical image processing and generation. For example, a product such as a door, can be positioned graphically as desired with the image of the user's house, and generates a visual effect of virtual fitting the door to the house.

According to still another aspect, the virtual fitting system can display and/or virtual fit a list of products in an efficient manner.

According to still another aspect, the virtual fitting system can iterate through a plurality of images and perform automatic image loading, processing, generation and displaying, rending a continuous virtual fitting experience to the user.

According to still another aspect, the virtual fitting system can manage a plurality of images and perform automatic image loading, editing, repositioning, processing, generation and displaying, rending an animated virtual fitting experience to the user.

Furthermore, the virtual fitting system is further configured for enabling a continuous virtual fitting and custom configuration of products and prototypes according to a procedure of processing and storing virtual fitting images with placeholder configurations in virtual fitting catalogs, creating automatic virtual fitting of variations of the products and prototypes using the virtual fitting catalogs.

In addition, it will assist user to input their reviews, feedbacks, customization preference and etc into the virtual fitting system. User can select the product through the system, customize and redesign the product based on user's style and preference, place in the orders and/or preorder products when they are not available in the inventory. These data entered by the user is collected by the system, processed and send to the corresponding parties.

According to still another aspect, the virtual fitting can collect and accumulate user input data, manage this data by data consolidation, processing, filtering, formatting and/or etc, and render a summarized representation of the data using charts, tables, diagrams, graphical images, reports and/or etc. This summarized representation of the data can be viewed by user through the reporting module of the virtual fitting system. This summarized representation of the data can also be saved in digital format such as a file, database and etc, and transferred to corresponding parties through an automatic or manual process, through wiring or wireless network and etc. This summarized representation of the data can also be printed out through printers for representation, as well as presented through other representation media for review and display.

The user of the virtual fitting system can be a person and/or an organization with different roles including but not limited to a consumer, vendor, retailer, distributor, stor-eowner, designer, manufacture and etc.

According to still another aspect, the virtual fitting system can facilitate consumers to place in user feedbacks and customized orders for products. Vendors can present products that are available and/or not yet available on the market, as well as templates or prototypes of products to consumers through the virtual fitting system. Consumer can review and/or preview these products, leave reviews, feedbacks, ratings for the products. Consumers can also customize and redesign the products based on his/her style and preference. The virtual fitting system collects the user input data from consumers, manage and process this data by data consolidation, processing, filtering, formatting and/or etc, and transfer the data to vendor. Consumers can also place in orders or preorder products with or without customizations through the virtual fitting system.

The virtual fitting system includes camera(s), touch screen graphic display(s), processor(s) and memory(s). The system may also include units such as media storage, battery, sensors, input and output units, if not combined as part of another unit of the virtual fitting system. The system may also include units for wiring and wireless communication. The system may also include an internal and/or external display unit such as a TV, projector and/or etc.

The camera captures the images of the wearable product as well as images from the user, such as the body, face, hand and etc. The processor generates a plurality of matrices used and process the images. The data storage store the data and images, and the touch screen display units display graphic user interface and handles user interaction. The external display unit provides additional graphical displays to the user, potentially, on a large display surface.

According to one aspect, the virtual fitting system can be a portable media device also function as a solid-state drive for data storage. The form factor of the virtual fitting system can be hand-held and portable, or it can be a graphical display device with computation capability such as a touch screen TV. The virtual fitting system can also include a peripheral bus connector, a rechargeable battery, and one or more input and output devices. According to another aspect, the virtual fitting system has the capability to store media in persistent memory. Thereafter, when the virtual fitting system is again powered up, the stored media and data can be retrieved and utilized. According to still another aspect, the virtual fitting system can form, display and/or traverse image assets in an efficient manner, through a manual and/or automatic process.

BRIEF DESCRIPTION OF THE DRAWINGS

For a more succinct understanding of the nature and objects of the present invention, reference should be directed to the following detailed description taken in connection with the accompanying drawings in which:

FIG. 3A is a flowchart that shows the sequence of the processes when a vendor user loads and configures images of products to create an inventory list of virtual fitting images using placeholders, and stores the virtual fitting images with placeholder configurations to data storage to prepare for the virtual fitting process.

FIG. 3B is a flowchart that shows the virtual fitting process when a consumer user load product images with place holder configurations from data storage, and virtual outfit said product images with the user's photo.

DETAILED DESCRIPTION OF THE INVENTION

Figure 1:
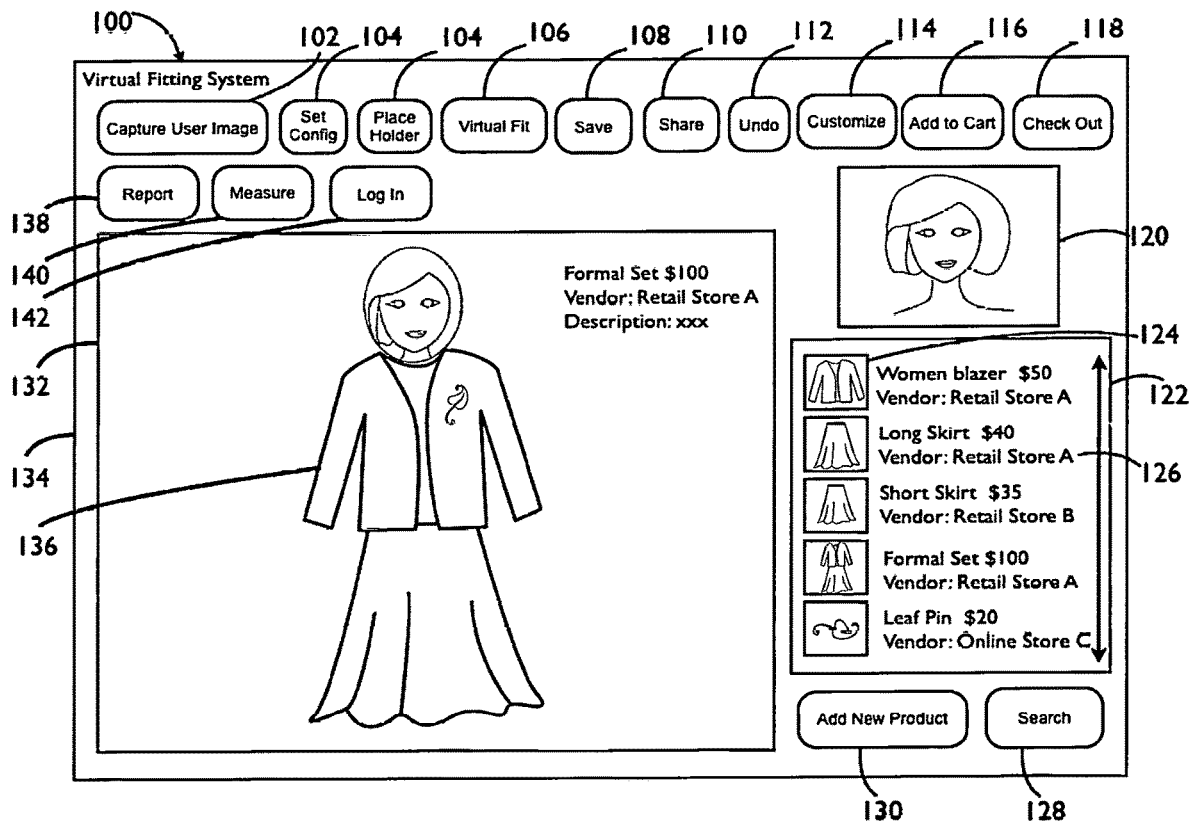
FIG. 1 is a diagram of an exemplary embodiment of the implementation of the virtual fitting system.

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principles of the invention as described herein are contemplated as would normally occur to one skilled in the art to which the invention relates.

With reference to FIG. 1, a diagram for an exemplary implementation of the virtual fitting system, such as virtual fitting system 100. For this implementation of the virtual fitting system 100, the user interaction is handled through the touch screen display 134. The inventory list of the apparels 122 are loaded into the memory 208 when the virtual fitting system 100 was started. By clicking the add new product button 130, user can load new product from the media storage 210, or user can capture new image of a product through camera 202, and add it into the inventory list 122. Consumer can search for products that may meet his/her criteria by clicking the search button 128 and enter keywords to conduct a search. The products that result from this search will be displayed in the inventory list 122. A snapshot of the product, as well as product description, vendor name, pricing and other information related to the product are shown for the product item 126 on the inventory list 122.

Figure 2:
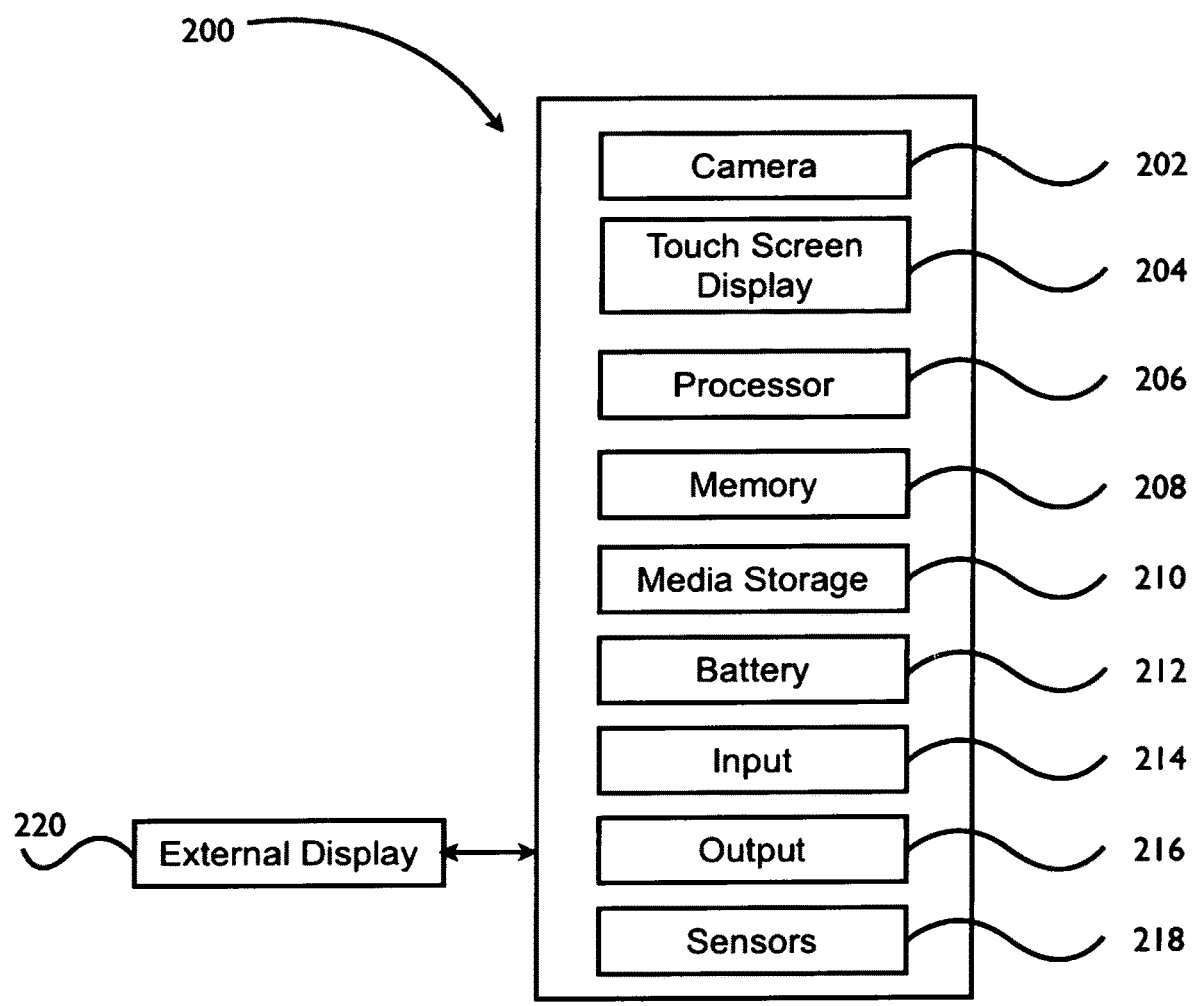
FIG. 2 is a block diagram of an exemplary implementation of the virtual fitting system according to one embodiment of the invention.

With reference to FIG. 2, a diagram for an exemplary implementation of the virtual fitting system, when a user starts the virtual fitting process, he/she click the capture user image button 102, which enables the camera 202, and take a picture of the user 310. The image is then display on the user image area 120. The user select the user image 120 to display it on the user input area 132, review and mark the placeholder(s) 306 on his/her image 310, to prepare for the virtual fitting process. User click the set configuration button 104 to save the configurations and store the configuration data to the system memory 208. By clicking the virtual fit button 106, user starts the virtual fitting process. User select product(s) from the inventory list 122 to perform the virtual fitting. User can virtual fit a list of products in an efficient manner, by iterating through the inventory list 122. The visual graphical result 136 generated by combining the user image with the image of the product is displayed in user input area 132. User may save the virtual fitting result 136 to the system by clicking the save button 108. By clicking the share button 110, user may select and share the image and data with other people or system, through email, messaging, social sharing channels, Wi-Fi, bluetooth and other sharing tools and methods. User can undo the fitting result and/or placeholder configuration by clicking the undo button 112. User can customize the product(s) by clicking the customize button 114, and input customization details through the user input area 132 on the touch screen display 134. After reviewing the virtual fitting result 136, user can add products to his/her shopping cart by clicking the add to cart button 116, and proceed to check out to complete the purchase by clicking the checkout button 118. User may click the report button 138 to view and manage reports generated from the data collected by the virtual fitting system. User may click the measure button 140 to measure and detect the size, length, dimension, shape and etc of an object shown in the image. User may click the log in button 142 to register or log into the virtual fitting system.

With reference to FIG. 2, an embodiment of a virtual fitting environment for implementing the embodiments described herein includes a virtual fitting system, such as virtual fitting system 200. Any and all components of the virtual fitting system may execute as or on a touch screen mobile device such as a phone or tablet, a touch screen TV with computation capability, a computer system, and/or other possible multi-media devices with computation capability. As such, a basic virtual fitting system applicable to all these environments is described hereinafter.

In its most basic configuration, virtual fitting system 200 comprises at least one processing unit or processor 206 and system memory 208, a camera 202, a touch screen display 204. In embodiments, data and images are loaded into memory 208 and executed by the processing unit 206 from system memory 208. Depending on the exact configuration and type of system 200, memory 208 may be volatile (such as RAM), non-volatile (such as ROM, flash memory, etc.), or some combination of the two.

Additionally, virtual fitting system 200 may also have other components. For example, virtual fitting system 200 includes additional media storage 210, such as removable and/or non-removable media storage, including, but not limited to SD memory card, magnetic or optical disks or tape. Virtual fitting system 200 may have battery 212 to provide power when not connected to an external power source.

Virtual fitting system 200 may have input component 214 such as graphic drawing pad, mouse, keyboard and etc. The display may be embedded with touch sensors, thus function as a touch screen display 204. The virtual fitting system 200 may have output component 216, which handles the displays and transfer of both image and data outputs from the virtual fitting system to other devices and/or systems. Virtual fitting system 200 may have sensor component(s) 218, such as touch sensor, light sensor, GPS sensor, near field communication sensor and/or etc to handle the sensing, receiving and transferring of data.

Virtual fitting system 200 can use an external display 220 to provide better visualization result, such external display 220 can be a TV, a projector device and/or etc. The external display 220 may be connected with the virtual fitting system 200 through wiring or wireless connections including but not limited to Wi-Fi, bluetooth connection and/or etc.

With reference to FIG. 3A, a vendor user creates an image repository for the products to prepare for the virtual fitting process. The vendor user starts the virtual fitting system, loads images of the products from memory 208 or media storage 210 that is located on the system 200. The vendor user may use camera 202 to capture new images of the products and add them to the list of inventory 122. The vendor user may load and inputs the corresponding product details 126 including product description, vendor name, pricing and other information related to the product. The vendor user may mark the placeholders for the product images on the user interface, review and adjust such placeholders until they are properly placed for the virtual fitting purpose. The vendor user may save the images as well as the configuration data of the placeholders to system memory 208 and/or media storage 210. The configured product images are shown in the inventory list 122 and ready for the virtual fitting process.

With reference to FIG. 3B, a consumer user starts the virtual fitting process, the consumer loads the product images from the system memory 208 and/or media storage 210, the product images with placeholder configurations that are available for virtual fitting are shown in the inventory list 122. The consumer user can take a photo of himself/herself, or an object that will be used for virtual fitting with the camera 202. The consumer user reviews the photo and marks the placeholder area(s) to be used for the virtual fitting on the consumer user interface, further review and adjust such placeholders until they are properly placed for the virtual fitting purpose. The consumer user may save the configuration settings by clicking the set configuration button 104. Then the consumer user may select the products from the inventory list 122 and starts the virtual fitting process. The virtual fitting system automatically processes the images, and generates the continuous virtual fitting results and display it on the consumer user input area 132 on the touch screen display 134. The user can review the visual results generated by the virtual fitting system 200 on the touch screen display 204 and/or external display unit 220. User can virtual fit a list of products virtual fitting images with placeholder configurations in an efficient manner, by iterating through the inventory list 122 in the virtual fitting catalogs.

Figure 4A:
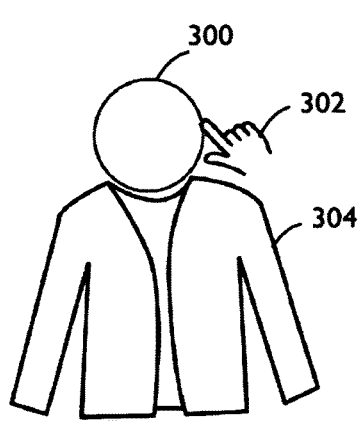
FIG. 4A shows an illustration of a vendor user configures the image of an apparel by drawing a placeholder on top of the apparel on a touch screen display.

With reference to FIG. 4A, a user select an image of a product 304 to from the inventory list 122, the image is display on the user input area 132. The user uses a finger 302 or a drawing media such as a tablet stylus pen and etc, and draws a placeholder 300 on the user input area 132. When the user clicked the set configuration button 104, the configuration settings are saved in system memory 208. When user clicked the save button 108, the processed image as well as the configuration data of the placeholders are stored into system memory 208 and/or media storage 210.

Figure 4B:
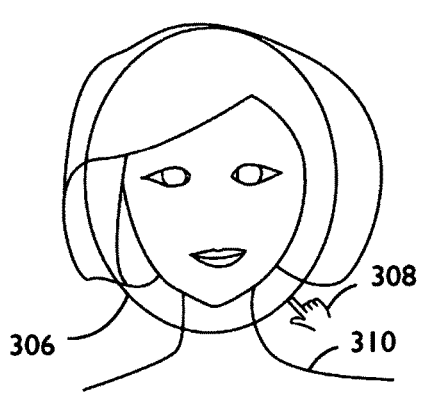
FIG. 4B shows an illustration of a user configures a photo of the consumer user, drawing a placeholder around the face area in the photo on a touch screen display.

With reference to FIG. 4B, a user select an image of a user 120, the image is display on the user input area 132. The user uses a finger 308 or a drawing media such as a tablet stylus pen and etc, and draws a placeholder 306 on the user input area 132. When the user clicked the set configuration button 104, the configuration settings are saved in system memory 208. When user clicked the save button 108, the processed image as well as the configuration data of the placeholders are stored into system memory 208 and/or media storage 210.

Figure 4C:
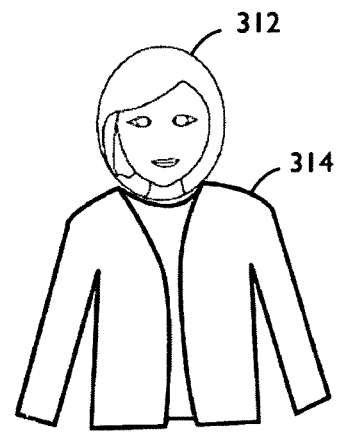
FIG. 4C shows an illustration of a virtual fitting result. The image of the apparel is positioned graphically as appropriate with the image of the consumer user, matching the placeholder on the consumer user photo to the placeholder on the apparel, generates a visual effect of the consumer user wearing the apparel.

With reference to FIG. 4C, a user performed the virtual fitting process by clicking on the virtual fit button 106. The virtual fitting system 100 generates the virtual fitting result and display it on the user input area 132. The virtual fitting result is a graphical display with the product and/or the user's images being edited and processed, and positioned as appropriate with each other, and creates a visual effect of the user/object virtually fitted with the product. In the example shown in FIG. 4C, it is a user wearing an apparel.

Figure 4D:
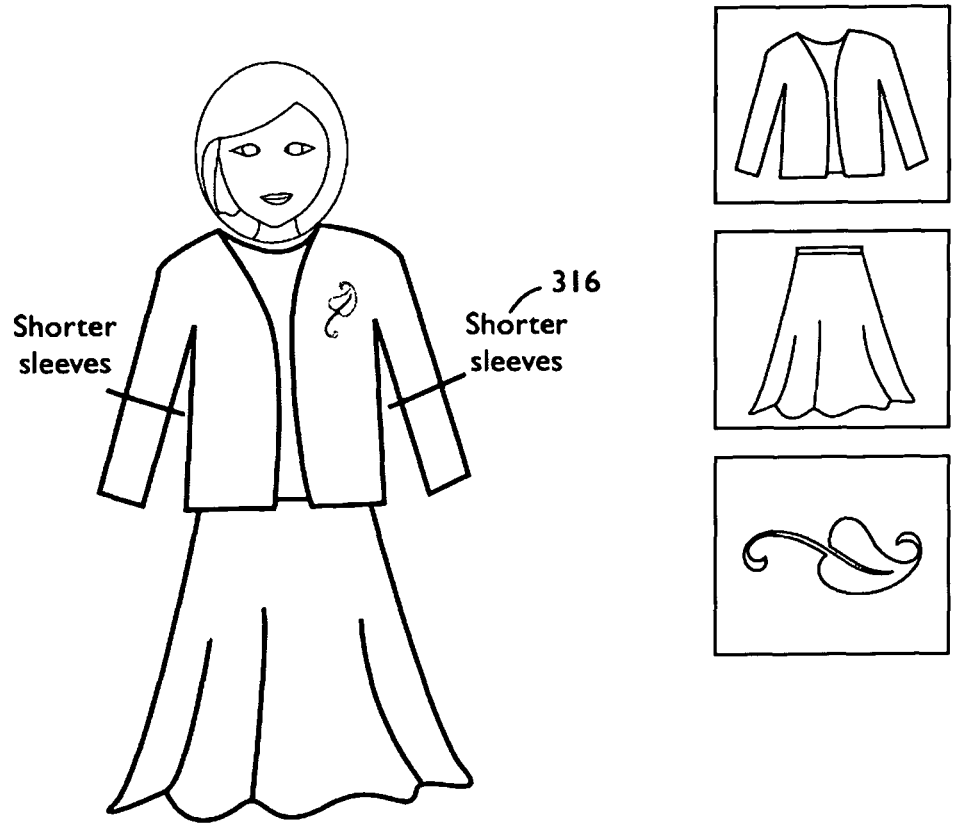
FIG. 4D shows an illustration of a user inputs feedbacks on top of the graphical image generated from the virtual fitting. The user requests the vendor to provide a customized version of the apparel that has shorter sleeves.

With reference to FIG. 4D, a user reviews the virtual fitting result, and leaves customization feedbacks on the user input area 132, requests a customized version of the apparel with shorter sleeves 316. Based on the configuration of the system, user may share 110 the feedback with other parties, send request/feedbacks to the vendor or designer, add/or this customized apparel to her shopping cart 116, and proceed to the check out 118.

Figure 4E:
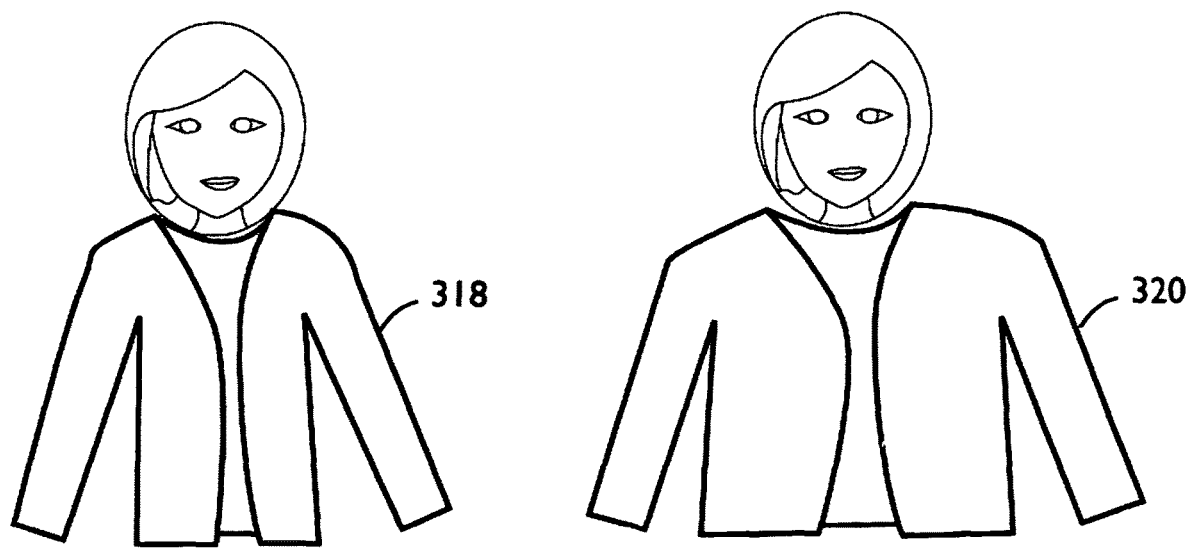
FIG. 4E shows an illustration of the virtual fitting system process and configure the image of the apparel, based on the body type of the user, and renders a visual effect of the apparel being suited to a leaner and/or larger body type users.

Furthermore, with reference to FIG. 4E, based on the body type of the user or shape of the object, the system can then stretch 320 or shrink 318 the product image or portions of the product image to match the body type of the user or shape of the object, and enhance the virtual fitting result. FIG. 4E shows an illustration of the system process and configure the image of the apparel, based on the body type of the user, renders a visual effect of the apparel being suited to a leaner or larger body type user.

Figure 5:
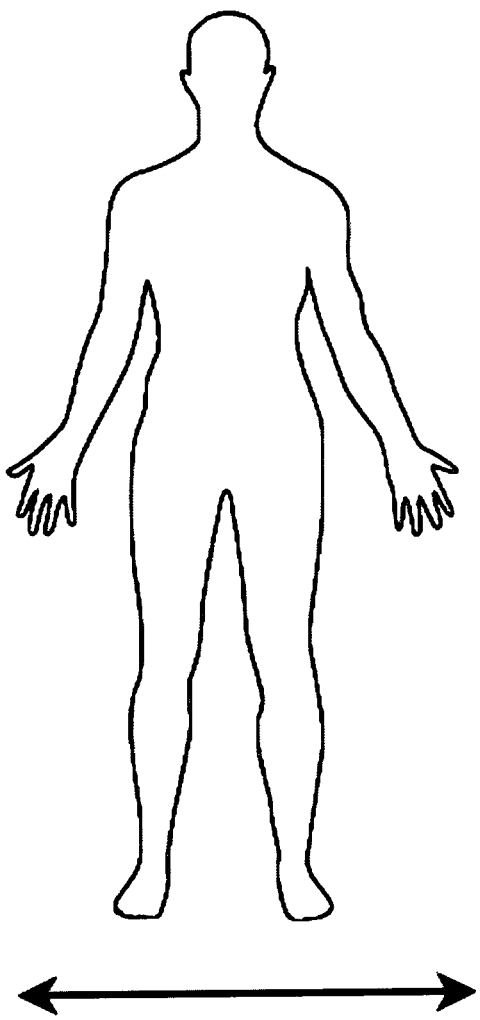
FIG. 5 shows an illustration of the process of the virtual fitting system measures a user's body dimensions.

With reference to FIG. 5, by requesting user to enter information such as height, weight, dimension, length and other data, and by measuring and processing the image with metrics and other measures, the virtual fitting system 200 can calculate and detect the body type of the user, or the shape/dimension of the object.

Figure 6:
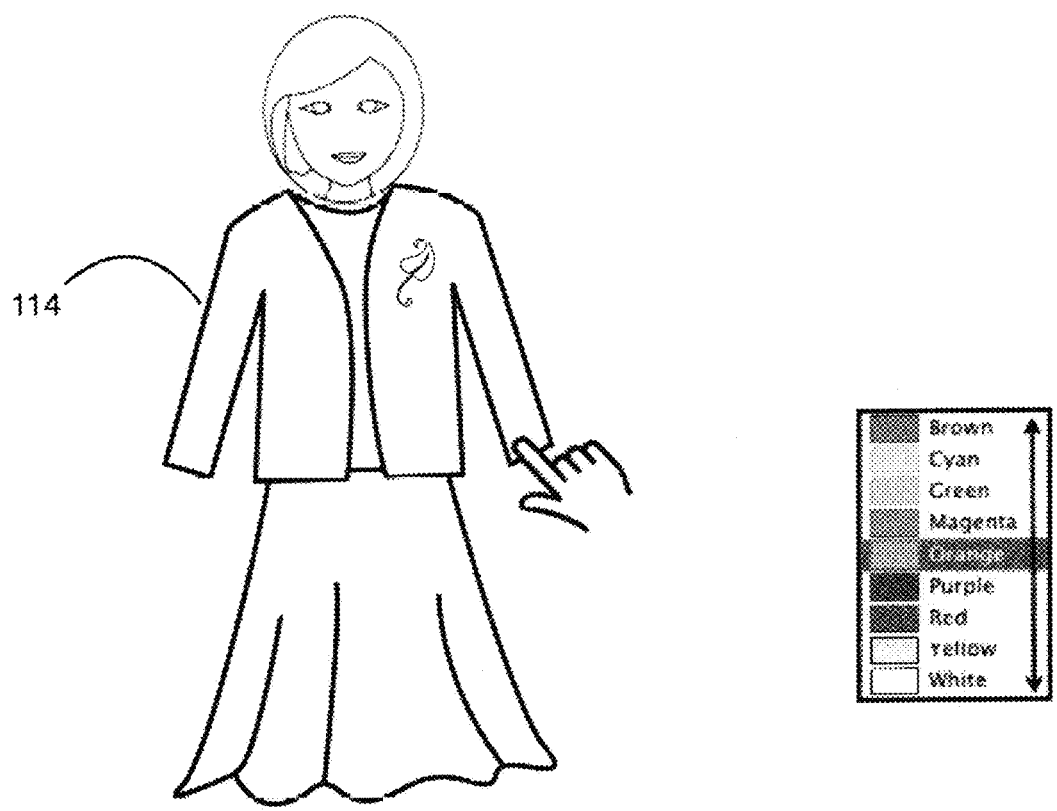
FIG. 6 shows an illustration of a user makes customization to an apparel by changing the color of the apparel.
Figure 7:
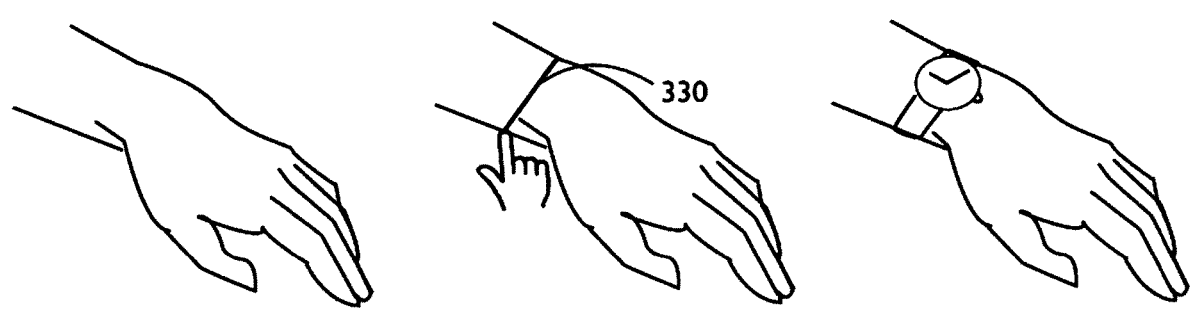
FIG. 7 shows an illustration of the process of virtual fitting the user's hand with a watch using a line for the placeholder configuration.

With reference to FIG. 6, using the virtual fitting system, user can customized 114 the product by changing its shape, size, color, dimension can etc. User can also customized the product by adding, removing, positions, editing components, elements, attachments, fixtures and etc to the product. FIG. 6 shows a user replaced the color of the apparel by choosing a different color from the color palette provided by the virtual fitting system. FIG. 7 shows an illustration of the process of virtual fitting the user's hand with a watch. User takes a photo of his/her hand, select the photo for editing, mark the placeholder 330 on the user input area 132, and virtual fit 106 it with a watch that he/she selected from the inventory list 122.

Figure 8:
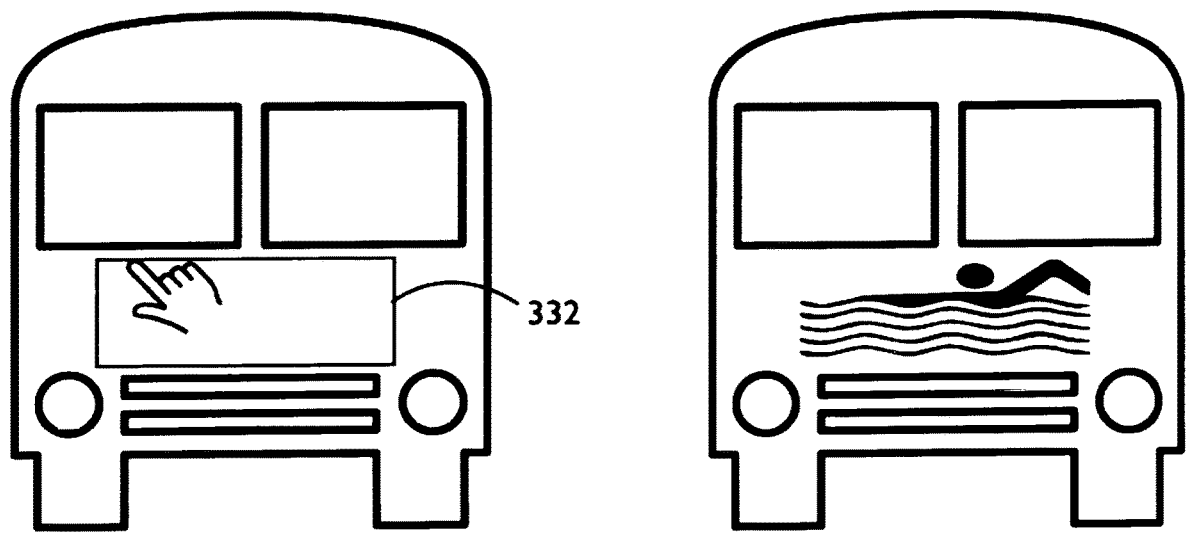
FIG. 8 shows an illustration of the process of virtual fitting the image of the back of a bus with an advertisement sign of swimming using a rectangle for the placeholder configuration.

FIG. 8 shows an illustration of the process of virtual fitting the image of the back of a bus with an advertisement image of swimming. User takes a picture of the back of a bus, select the photo for editing, mark the placeholder 332 of a rectangular shape on the user input area 132, and virtual fit 106 it with an advertisement design graphic that he/she selects from the inventory list 122.

Figure 9:
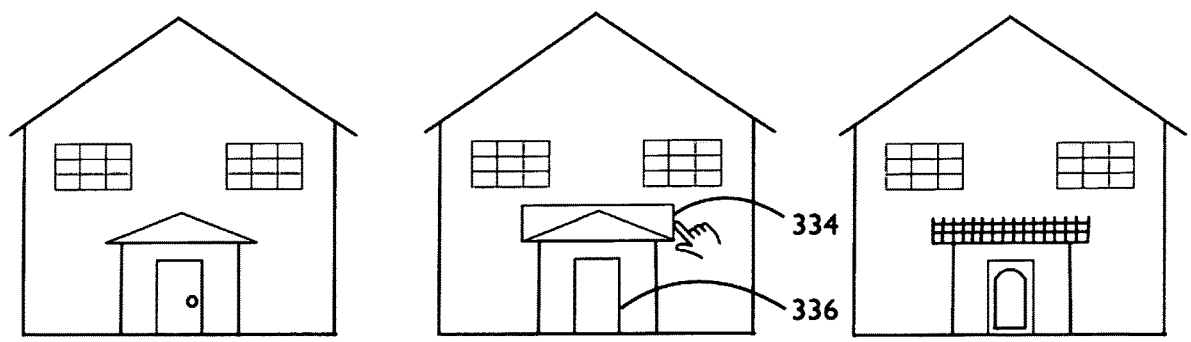
FIG. 9 shows an illustration of the process of virtual fitting the front of a house with a new canopy and door using two rectangles for the placeholder configurations.

FIG. 9 shows an illustration of the process of virtual fitting the front of a house with a new canopy and door. User takes a photo of the front of a house, select the photo for editing, mark the placeholders 334 and 336 on the user input area 132, and virtual fit 106 it with a canopy and a door that he/she selected from the inventory list 122.

Figure 10:
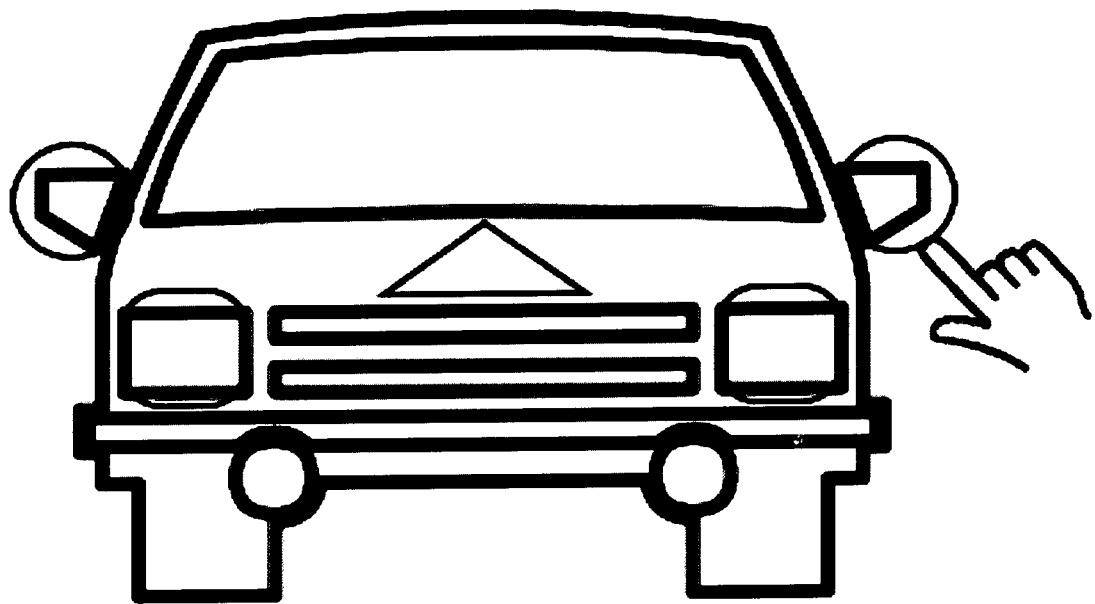
FIG. 10 shows an illustration of a user creates customization design and input feedbacks for a prototype of a car using two sets of placeholder configurations for the side mirrors and front lights.

FIG. 10 shows an illustration of a user customizes the design of a car by marking the areas that need to be changed on a touch screen display.

Figure 11A:
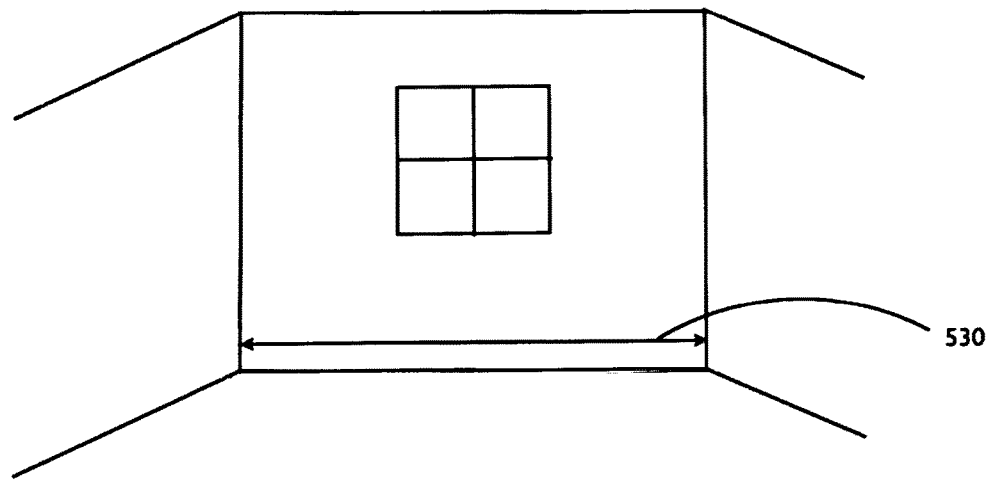
FIG. 11A shows an illustration of a user measures the distance between two walls in his/her room.

FIG. 11A shows an illustration of a user measures the distance 530 between two walls in his/her room, using a measuring tape.

Figure 11B:
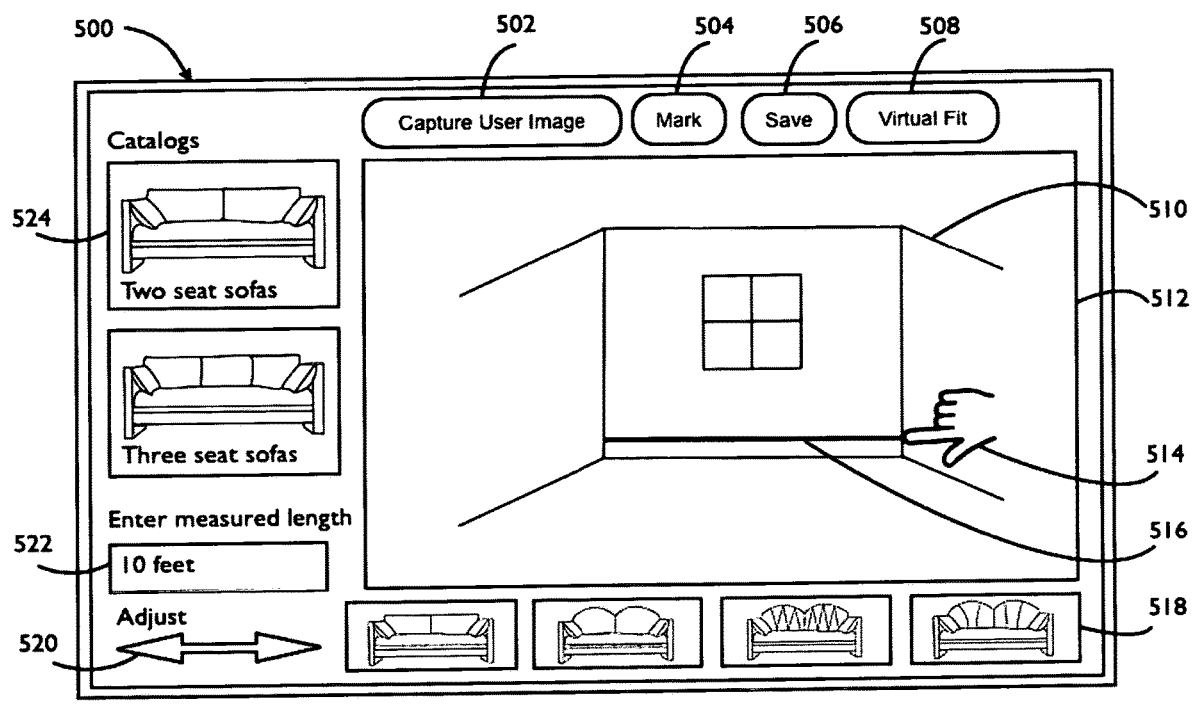
FIG. 11B is another diagram of an exemplary embodiment of the implementation of the virtual fitting system, where the user marks a line for the distance that he/she measured, and enters the measured length on the touch screen display.
Figure 11C:
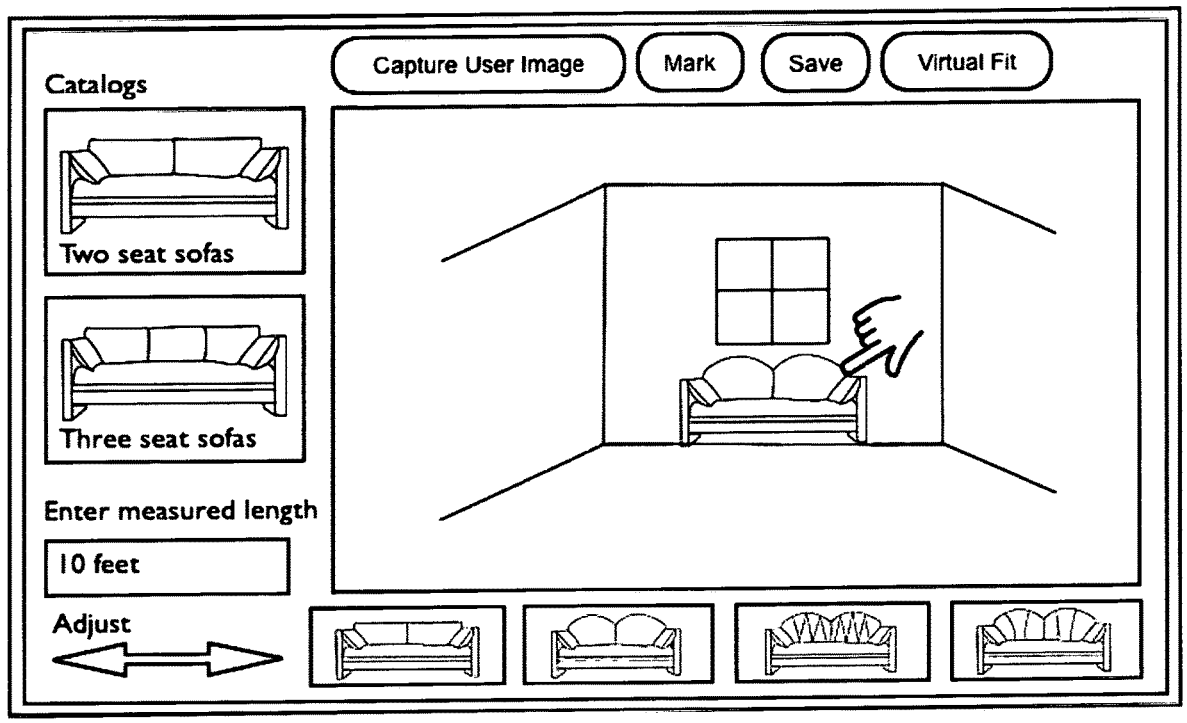
FIG. 11C is another diagram of said exemplary embodiment of the implementation of the virtual fitting system, where the user is using the virtual fitting system to virtual fit his/her room with sofas, using his/her finger to drag and drop the sofa to a different location on top of the image of his/her room on a touch screen display.

FIG. 11B is another diagram of an exemplary embodiment of the implementation of the virtual fitting system 500. The user clicks on the capture user image button 502 and takes a photo of his/her room using the device, the photo is displayed on the user image display area 512. He/she then clicks on the mark button 504, and draw a line 516 using his/her finger 514 on the touch screen display, tracing the distance 530 that he/she measured. He/she enters the measured length and unit 522 on the device, saves the settings by clicking on the save button 506, and clicks on the virtual fit button 508 to start virtual fitting products. User may virtual fit different products to his/her photo by clicking on the image icons 518 of the products. User may choose different product collections by selecting different catalogs 524, adjust the virtual fit settings using the adjust component 520. FIG. 11C is another diagram of an exemplary embodiment of the implementation of the virtual fitting system, where the user is using the virtual fitting system to select a sofa for his/her room, using his/her finger to drag and drop the image of a sofa to a different location on a photo of his/her room.

Figure 12:
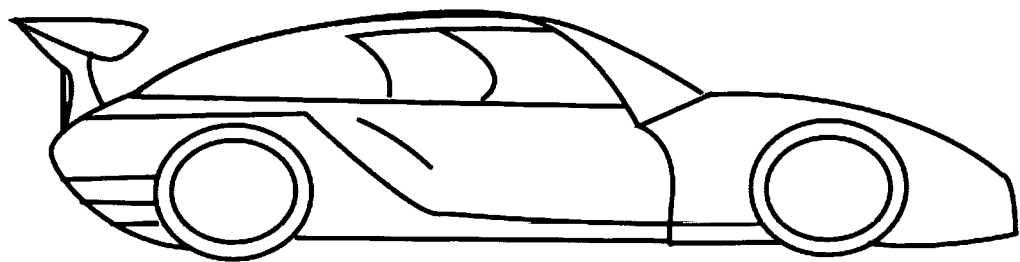
FIG. 12 shows an illustration of the virtual fitting system collects users' feedbacks on different tail wing designs for a new car model, and generates reporting charts based on the collected data.
Figure 12:
Figure 12:
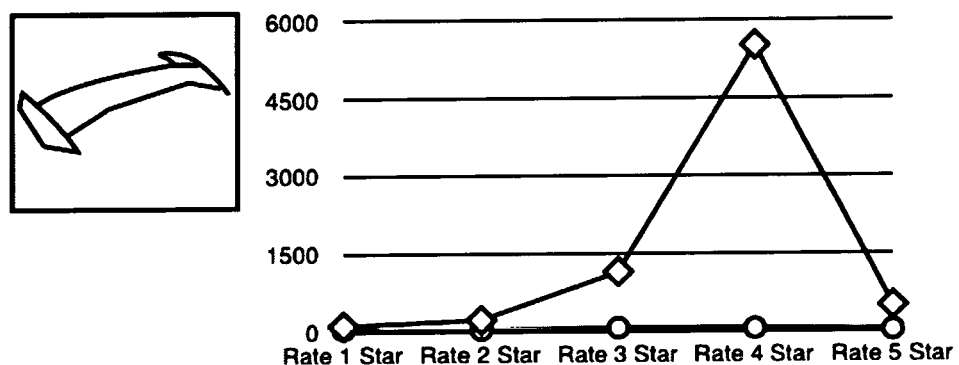

FIG. 12 shows a diagram with the illustration of the virtual fitting system collects users' reviews on different tail wing designs for a new car, compute the statistics of the data, and generates reporting charts. The first design receives positive feedbacks from both general users and potential customers, and has more five star ratings.

Furthermore, using the virtual fitting system 100, user may select a prototype product item from the inventory list 122, user may enter customized design inputs on the user input area 132, user may add the prototype product item to the shopping cart 116, order and/or preorder 118 the customized product. User may share 110 the customized design to other parties, user may send this customization request to the vendor or interact in other ways referring to the customized design. The virtual fitting system may collect customized design inputs from a plurality of users, process and consolidate the data, and generate reports from the data. The reports are sent to vendor and/or designer, and vendor and/or designer may use the information to refine and complete the product or the prototype of a product.

In this embodiment of usage, the virtual fitting system facilitates the vendor to enhance and refine a product or a prototype of a product, by collecting and consolidating user input from consumers and/or potential customers. Furthermore, a vendor can start the manufacture or production of a product after the prototype have been reviewed preferably by the consumers. A vendor may start the manufacture or production of a product when a plurality of order/preorder has been place on the product or prototype of a product. A vendor may also allocate their resources by manufacturing or producing the product lines or variation of the products that are preferred by a large number of consumers. It is a thus encapsulated as virtual fitting the product with the market before production. In other words, testing a product with the market before manufacturing of the product. This invention, in time, shall increase the efficiency in the chain of activities in production process, that includes but not limited to product design, supply, sourcing, manufacturing, producing, distribution, marketing, sales and consumption.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

Although the invention is described herein with reference to the preferred embodiment, one skilled in the art will readily appreciate that other applications may be substituted for those set forth herein without departing from the spirit and scope of the present invention.

What is claimed is:

1. A method for continuous virtual fitting and custom configuration of products and prototypes according to a procedure for storing virtual fitting images with placeholder configurations in virtual fitting catalogs of a virtual fitting system, the method comprising the steps of:
   a. receiving, from a vendor, a product image from a camera connected to a vendor user interface;
   b. in response to the vendor marking and adjusting positions for a plurality of placeholders on the product image using the user interface, storing the plurality of placeholders with the product image as a virtual fitting image, wherein the plurality of placeholders include at least a mask, a transparent area, and a measurement;
c. receiving, from a consumer, a consumer image from a consumer user interface;
d. adjusting and positioning the consumer image to the virtual fitting image, matching an area in the consumer image to the plurality of placeholders in the virtual fitting image, rendering a virtual fitting result of the consumer wearing and/or virtual fitting a product for the product image;
e. providing the user interface for the consumer to mark a line and entering a measurement for the line, wherein the measurement was taken by the consumer using a measuring tool;
f. automatically scaling and positioning the virtual fitting image on top of the consumer image based on a matching at least one of the plurality of placeholders on the product image with the consumer image, wherein the automatically scaling and positioning is further based on the measurement for the line;
g. creating an output for display of the automatically scaled and positioned virtual fitting image on top of the consumer image.

2. The method in accordance with claim 1, wherein the consumer can virtual fit a plurality of photos to a plurality of virtual fitting images at the same time.

3. The method in accordance with claim 1, wherein the user interface is further configured for the consumer to purchase, order, preorder, bulk order, custom order, and/or combine orders of the products, custom products or prototypes.

4. The method in accordance with claim 1, wherein the user interface is further configured for the consumer to enter a customization request, redesign the products, redesign the prototypes, add, remove, and/or replace components and/or features of the products or prototypes.

5. The method in accordance with claim 1, wherein the user interface is further configured for the consumer to enter, review, comment, and provide feedback on the products or prototypes, to communicate with provides, vendors, designers and/or other corresponding parties through the virtual fitting system.

6. The method in accordance with claim 1, wherein the virtual fitting system if further configured for vendors and/or designers to interact with the consumer, facilitating vendors and/or designers to refine and complete variations of the products and prototypes based on feedback and/or reports received from the consumer.

7. The method in accordance with claim 1, wherein the user interface is further configured for the consumer to virtual fit images of objects, apparels and/or environment to images of other objects, apparels, and/or environment captured, loaded, and/or selected by the consumer.

8. The method in accordance with claim 1, wherein the virtual fitting system is further configured for collecting feedback and/or custom design inputs from the consumer, process and consolidate data received, generate summarized representations using charts, tables, diagrams, graphical images and reports.

9. The method in accordance with claim 1, wherein virtual fitting catalogs are configured for providers, vendors, designers and/or other corresponding parties to deliver, distribute, display and showcase product virtual fittings, data, images and/or promotional information to the consumer.

10. The method in accordance with claim 1, wherein the virtual fitting system is further configured to automatically compute, adjust, scale and/or position other images corresponding to recalculated and/or repositioned locations, angles, dimensions, sizes and/or shapes of the plurality of placeholders, creating an animated and/or continuous virtual fitting experience for the consumer.

11. The method in accordance with claim 1, wherein the plurality of placeholders further include points, lines, shapes and/or areas, and are entered, generated and/or controlled through positioning and adjusting images and/or graphic components with specific attributes including marks, masks, transparent area, pixilated area, whitened area, blackout area, measurements, dimensions and sizes.

12. The method in accordance with claim 1, wherein placeholder configurations provide color choices, further assisting the consumer to design and/or chose custom colors for the product or prototype using the virtual fitting system.

13. The method in accordance with claim 1, wherein the virtual fitting image is displayed in a background, while an images of people, objects and/or environments are displayed in a foreground.

14. A system for continuous virtual fitting and custom configuration of products and prototypes according to a procedure for storing virtual fitting images with placeholder configurations in virtual fitting catalogs of a virtual fitting system, the system comprising a computer and memory configured with instructions to perform the following steps:
a. receiving, from a vendor, a product image from a camera connected to a vendor user interface;
b. in response to the vendor marking and adjusting positions for a plurality of placeholders on the product image using the user interface, storing the plurality of placeholders with the product image as a virtual fitting image, wherein the plurality of placeholders include at least a mask, a transparent area, and a measurement;
c. receiving, from a consumer, a consumer image from a consumer user interface;
d. adjusting and positioning the consumer image to the virtual fitting image, matching an area in the consumer image to the plurality of placeholders in the virtual fitting image, rendering a virtual fitting result of the consumer wearing and/or virtual fitting a product for the product image;
e. providing the user interface for the consumer to mark a line and entering a measurement for the line, wherein the measurement was taken by the consumer using a measuring tool;
f. automatically scaling and positioning the virtual fitting image on top of the consumer image based on a matching at least one of the plurality of placeholders on the product image with the consumer image, wherein the automatically scaling and positioning is further based on the measurement for the line;
g. creating an output for display of the automatically scaled and positioned virtual fitting image on top of the consumer image.

15. The system in accordance with claim 14, wherein the consumer can virtual fit a plurality of photos to a plurality of virtual fitting images at the same time.

16. The system in accordance with claim 14, wherein the user interface is further configured for the consumer to purchase, order, preorder, bulk order, custom order, and/or combine orders of the products, custom products or prototypes.

17. The system in accordance with claim 14, wherein the user interface is further configured for the consumer to enter a customization request, redesign the products, redesign prototypes, add, remove, and/or replace components and/or features of the products or the prototypes.

18. The system in accordance with claim 14, wherein the user interface is further configured for the consumer to enter, review, comment, and provide feedback on the products or the prototypes, to communicate with provides, vendors, designers and/or other corresponding parties through the virtual fitting system.

19. The system in accordance with claim 14, wherein the virtual fitting system if further configured for vendors and/or designers to interact with the consumer, facilitating vendors and/or designers to refine and complete variations of the products and prototypes based on feedback and/or reports received from the consumer.

20. The system in accordance with claim 14, wherein the user interface is further configured for the consumer to virtual fit images of objects, apparels and/or environment to images of other objects, apparels, and/or environment captured, loaded, and/or selected by the consumer.

21. The system in accordance with claim 14, wherein the virtual fitting system is further configured for collecting feedback and/or custom design inputs from the consumer, process and consolidate data received, generate summarized representations using charts, tables, diagrams, graphical images and reports.

22. The system in accordance with claim 14, wherein virtual fitting catalogs are configured for providers, vendors, designers and/or other corresponding parties to deliver, distribute, display and showcase product virtual fittings, data, images and/or promotional information to the consumer.

23. The system in accordance with claim 14, wherein the virtual fitting system is further configured to automatically compute, adjust, scale and/or position other images corresponding to recalculated and/or repositioned locations, angles, dimensions, sizes and/or shapes of the plurality of placeholders, creating an animated and/or continuous virtual fitting experience for the consumer.

\* \* \* \* \*